United States Patent
Kim et al.

(10) Patent No.: US 10,418,890 B2
(45) Date of Patent: Sep. 17, 2019

(54) ENERGY HARVESTER WITH MAGNETS AND SELF-ASSEMBLED FERROFLUID LIQUID BEARING

(71) Applicant: University of Southern California, Los Angeles, CA (US)

(72) Inventors: Eun Sok Kim, Rancho Palos Verdes, CA (US); Yufeng Wang, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 31 days.

(21) Appl. No.: 15/444,125

(22) Filed: Feb. 27, 2017

(65) Prior Publication Data
US 2017/0346376 A1  Nov. 30, 2017

Related U.S. Application Data

(60) Provisional application No. 62/342,477, filed on May 27, 2016.

(51) Int. Cl.
| | |
|---|---|
| *H02K 35/02* | (2006.01) |
| *H01F 41/04* | (2006.01) |
| *H02K 15/02* | (2006.01) |
| *H02K 3/26* | (2006.01) |

(52) U.S. Cl.
CPC ............. *H02K 35/02* (2013.01); *H01F 41/04* (2013.01); *H02K 15/02* (2013.01); *H02K 3/26* (2013.01)

(58) Field of Classification Search
CPC ........ H02K 33/00; H02K 35/02; H02K 35/00; H02K 35/04; H02K 3/26; H02K 15/02; H01F 41/04

USPC ........... 310/14, 15, 16, 25, 12.01–12.33, 28
See application file for complete search history.

(56) References Cited

U.S. PATENT DOCUMENTS

| | | | | |
|---|---|---|---|---|
| 6,812,598 | B2* | 11/2004 | Cheung | H02K 35/02 290/1 R |
| 8,193,781 | B2* | 6/2012 | Lin | H02K 3/26 322/3 |
| 8,861,776 | B2* | 10/2014 | Lastrucci | H04R 11/02 310/12.01 |
| 9,041,230 | B2* | 5/2015 | Arnold | H02K 35/04 290/1 R |
| 9,231,461 | B2* | 1/2016 | Kim | H02K 35/00 |
| 9,692,287 | B2* | 6/2017 | Yamamoto | H02K 35/02 |
| 9,942,663 | B1* | 4/2018 | Salvatti | H04R 9/025 |

(Continued)

OTHER PUBLICATIONS

EIC Search Report by EIC STIC 2800.*

*Primary Examiner* — Julio C. Gonzalez
*Assistant Examiner* — Maged M Almawri
(74) *Attorney, Agent, or Firm* — Snell & Wilmer LLP

(57) ABSTRACT

A vibration energy harvester that converts kinetic energy to electrical energy. The vibration energy harvester includes an electrically conductive coil array, a magnetic array and a self-assembled liquid bearing. The magnetic array is levitated above the electrically conductive coil array. The magnetic array and the electrically conductive coil array are configured to generate the electrical energy from a relative movement between the magnetic array and the electrically conductive coil array. The self-assembled liquid bearing separates the magnetic array from the electrically conductive coil array and levitates the magnetic array over the electrically conductive coil array.

14 Claims, 9 Drawing Sheets

(56) References Cited

U.S. PATENT DOCUMENTS

| | | | |
|---|---|---|---|
| 2005/0151375 A1* | 7/2005 | Cheung | B60C 23/041 |
| | | | 290/1 R |
| 2007/0052302 A1* | 3/2007 | Cheung | B82Y 25/00 |
| | | | 310/12.12 |
| 2011/0057629 A1* | 3/2011 | Lin | H02K 3/26 |
| | | | 322/3 |
| 2011/0140458 A1* | 6/2011 | Arnold | H02K 35/04 |
| | | | 290/1 R |
| 2011/0140577 A1* | 6/2011 | Galchev | H01L 41/12 |
| | | | 310/339 |
| 2011/0169347 A1* | 7/2011 | Miyamoto | B06B 1/045 |
| | | | 310/12.21 |
| 2012/0086213 A1* | 4/2012 | Chan | F16C 32/0406 |
| | | | 290/55 |
| 2012/0211990 A1* | 8/2012 | Davey | F03B 13/264 |
| | | | 290/54 |

\* cited by examiner

ENERGY HARVESTER WITH MAGNETS AND SELF-ASSEMBLED FERROFLUID LIQUID BEARING

CROSS-REFERENCE TO RELATED APPLICATIONS

This application claims priority to and the benefit of U.S. Provisional Application No. 62/342,477, titled "ENERGY HARVESTER BASED ON SELF-ASSEMBLED LIQUID BEARING," filed on May 27, 2016, and the entire application of which is hereby incorporated by reference herein.

STATEMENT REGARDING GOVERNMENT RIGHTS

This invention was made with Government support under Grant No. N66001-13-1-4055 awarded by the Defense Advanced Research Projects Agency (DARPA) and under Grant No. ECCS-1308041 awarded by the National Science Foundation (NSF). The Government has certain rights in this invention.

BACKGROUND

1. Field

This specification relates to a system for converting vibration energy to electrical energy and a method for fabricating the vibration energy harvester.

2. Description of the Related Art

Vibrations are found in many places and on many objects such as building walls, bridges, automobiles, airplanes, human body, etc. These ubiquitous vibration sources provide significant amount of renewable energy that can be harvested and used to power electronic devices including sensors, actuators, wireless transceivers, etc. Typical vibration-energy harvesters rely on the resonance of a proof-mass suspension system with optimal performances that cover only a narrow frequency band at a relatively high frequency, such as tens to hundreds of Hertz (Hz). Both the narrow band and the high resonant frequency are limiting when harvesting naturally-occurring vibration, such as a human's walking motion (which is typically 2-4 Hz). Accordingly, there is a need for an efficient non-resonant vibration energy harvester that can capture and convert kinetic energy into electrical energy at all frequency components of a vibration with a low frequency range.

SUMMARY

In general one aspect of the subject matter described in this specification is embodied in a non-resonant vibration energy harvester ("vibration energy harvester"). The vibration energy harvester converts kinetic energy to electrical energy. The vibration energy harvester includes an electrically conductive coil array, a magnetic array and a self-assembled liquid bearing. The magnetic array is levitated above the electrically conductive coil array. The magnetic array and the electrically conductive coil array are configured to generate the electrical energy from a relative movement between the magnetic array and the electrically conductive coil array. The self-assembled liquid bearing separates the magnetic array from the electrically conductive coil array and levitates the magnetic array over the electrically conductive coil array.

These and other embodiments may include one or more of the following features. The vibration energy harvester may include a coil plate that has the coil array embedded within and a chamber housing the magnetic array and that encloses the magnetic array and the electrically conductive coil array. The magnetic array may have multiple magnets. The multiple magnets may include 2-10 Neodymium (NdFeB) magnets with a polarization in a vertical direction. The electrically conductive coil array may have one or more coils. The electrically conductive coil may have a surface that is adjacent to the self-assembled liquid bearing that may have a hydrophobic coating to reduce friction.

The self-assembled liquid bearing may be formed from a ferrofluid that becomes magnetized in a presence of a magnetic field and is attracted by a magnet. The ferrofluid may concentrate along a boundary between two magnets and may follow the multiple magnets during vibration which produces the relative movement between the magnetic array and the electrically conductive coil array. The self-assembled liquid bearing may have a top portion and a bottom portion. The bottom portion may be flatter than the top portion due to a gravitational force exerted on the magnetic array. The electrical energy generated from the relative movement between the magnetic array and the electrically conductive coil array may be based on at least one of a viscosity, a surface area or magnetic characteristics of the self-assembled liquid bearing.

In another aspect, the subject matter is embodied in a non-resonant vibration energy harvester that converts kinetic energy to electrical energy. The vibration energy harvester includes a coil plate, a magnetic array, a chamber and a ferrofluid liquid. The coil plate has one or more electrically conductive coils. The magnetic array has multiple magnets. The chamber is on top of the coil plate and encloses the magnetic array and the one or more electrically conductive coils within the chamber. The ferrofluid liquid separates the multiple magnets from the one or more electrically conductive coils and reduces movement of the multiple magnets when an applied acceleration causes the one or more electrically conductive coils to move relative to the multiple magnets.

In another aspect, the subject matter is embodied in a method for fabricating the non-resonant vibration energy harvester. The method includes forming a coil plate from a polyimide laminate substrate that has a metal layer. The method includes forming one or more vertical interconnect access (VIA) holes within thin the polyimide laminate substrate and etching the polyimide laminate substrate to expose the metal layer to form the coil plate. The method includes electroplating metal into the VIA holes and forming a mold for the first set of one or more metal coils to form the coil plate. The method includes electroplating a second metal in the mold to form the first set of the one or more metal coils and etching the metal layer to form the second set of the one or more coils. The method includes exposing contact pads to electrically connect different layers of the coil to form the coil plate. The method includes assembling a magnetic array above the coil plate and depositing a liquid bearing between at least two magnets of the magnetic array. The method includes forming a chamber using acrylic to enclose the coil plate and the magnetic array.

BRIEF DESCRIPTION OF THE DRAWINGS

Other systems, methods, features, and advantages of the present invention will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention.

DETAILED DESCRIPTION

Disclosed herein are systems for a non-resonant vibration energy harvester that converts kinetic energy into electrical energy and methods for fabricating the non-resonant vibration energy harvester. Particular embodiments of the subject matter described in this specification may be implemented to realize one or more of the following advantages. A non-resonant vibration energy harvester that has a liquid bearing is able to convert kinetic energy, such as vibration energy, into electrical energy for a wide range of frequency components that may be at a low resonant frequency.

Typically, a vibration energy harvester relies on the resonance of a proof-mass suspension system. The optimal performance of a vibration energy harvester with a proof-mass suspension system occurs over a narrow frequency band and at a relatively high frequency. Most vibrations occur at the lower resonant frequency, e.g., between 0 and 99 Hz. The narrow frequency band at the relatively high frequency of the proof-mass suspension system severely limits the vibration energy harvester in capturing naturally-occurring vibrations which occurs at a relatively low frequency and over a relatively wide frequency band. Thus, a proof-mass suspension system has difficulty in capturing and converting vibrations at the lower resonant frequency into electrical energy.

Figure 8:
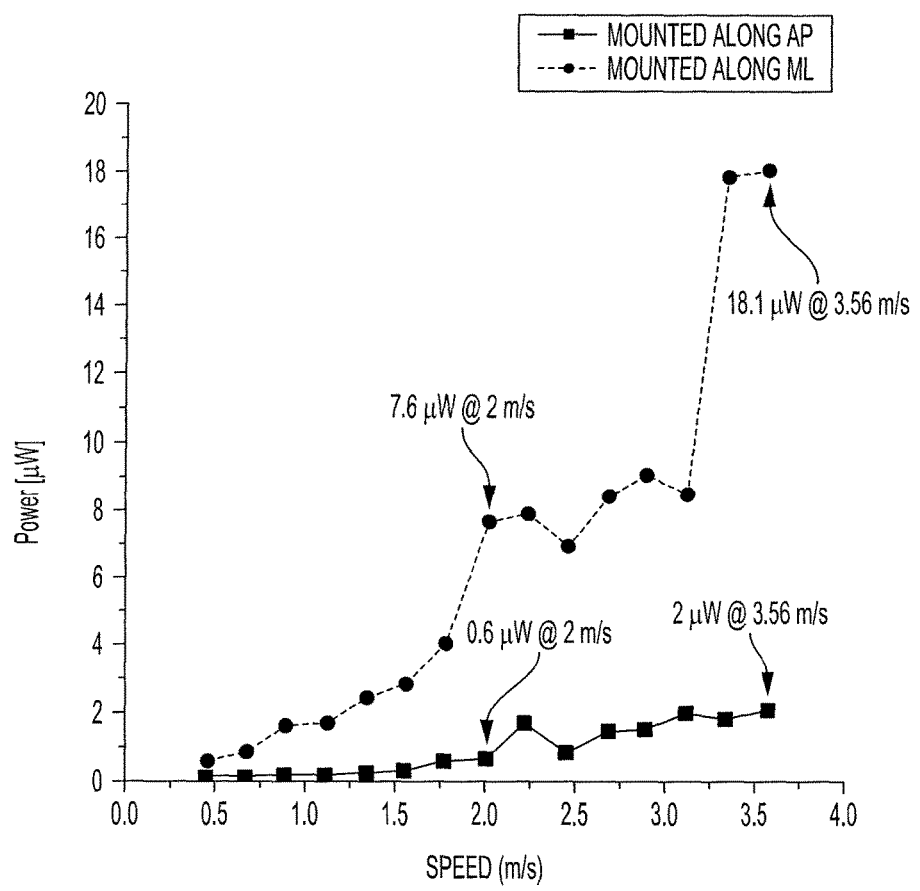
FIG. 8 illustrates the measured power delivered by an example vibration energy harvester to a matched load of 80Ω under various walking speeds according to an aspect of the invention.

A non-resonant vibration energy harvester with a liquid bearing captures vibration energy at all frequency components of a vibration and at a low resonant frequency range. This allows the non-resonant vibration energy harvester with the liquid bearing to more efficiently convert vibration energy from naturally-occurring vibrations into electrical energy. For example, the non-resonant vibration energy harvester having a liquid bearing is able to scavenge energy from a human's walking motion which occurs at a low resonant frequency. FIG. 8 illustrates the measured output power delivered by a non-resonant vibration energy harvester with a matched load of 80Ω under various walking speeds. The non-resonant vibration energy harvester has a magnetic array with a movable range of 6 mm and is mounted along the antero-posterior (AP) and medio-lateral (ML) direction.

Other benefits and advantages include that the liquid bearing acts as a lubricant between the magnetic array and the coil array. Consequently, the liquid bearing reduces the amount of friction and eventual wear resulting from the relative motion between the magnetic array and the coil array. Moreover, the reduced friction increases durability and reduces aging of the non-resonant vibration energy harvester.

Figure 1A:
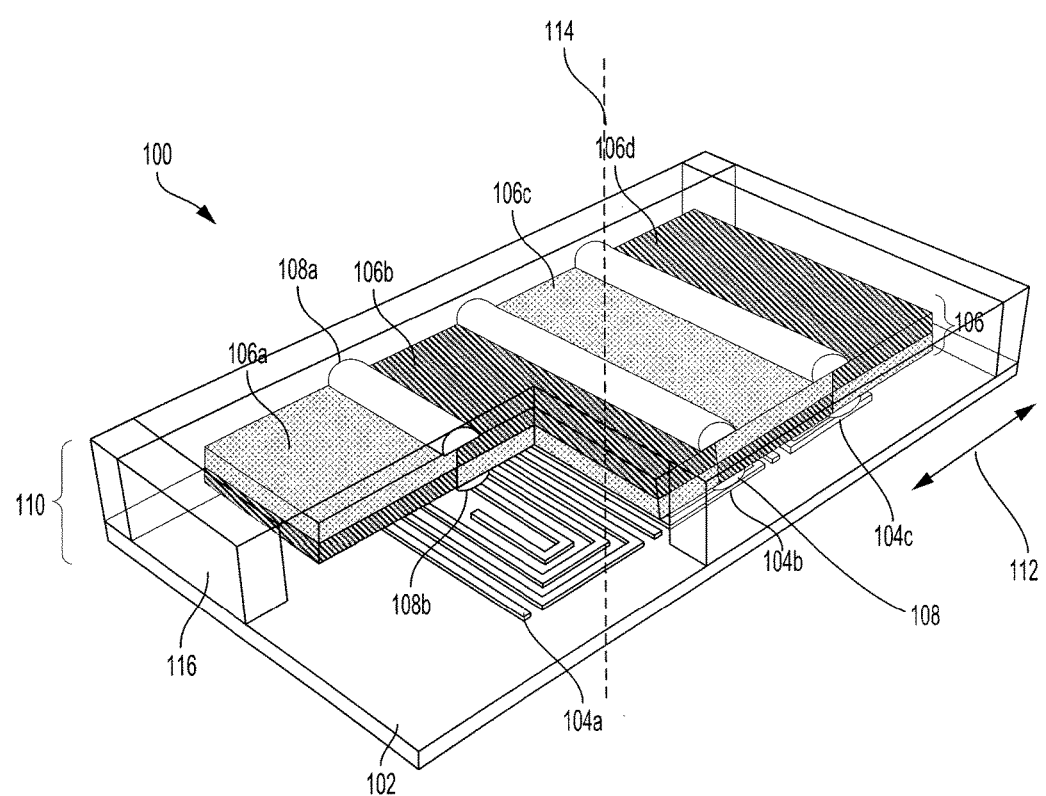
FIG. 1A illustrates a cross-sectional view of an example non-resonant vibration energy harvester according to an aspect of the invention.

FIG. 1 illustrates a cross-sectional view of a non-resonant vibration energy harvester ("vibration energy harvester") 100 that converts kinetic energy, such as vibration energy into electrical energy. The vibration energy harvester 100 has a resonant structure that includes a chamber 110, a magnetic array 106 and a liquid bearing 108. The chamber 110 is formed from a frame 116 bonded to a coil plate 102. The chamber 110 encloses the magnetic array 106 that is suspended by the liquid bearing 108.

The vibration energy harvester 100 includes a magnetic array 106 and a coil plate 102. The magnetic array 106 and coil plate 102 are configured to generate electrical energy from the relative movement between the magnetic array 106 and the coil plate 102 due to an applied acceleration to the chamber 110. The magnetic array 106 remains suspended above the coil plate 102 by the liquid bearing 108 when the applied acceleration moves the chamber 110. The vibration energy harvester 100 uses the magnetic array 106 to provide a rapid change of magnetic flux. When an acceleration is applied to the chamber 110, the coil plate 102 moves in a direction 112 while the magnetic array 106 remains approximately in the position 114 and is not dragged in the direction 112 because the liquid bearing 108 suspends the magnetic array 106. The magnetic array 106 may include multiple magnets 106a-d, e.g., 2-10 Neodymium (NdFeB) magnets. The one or more magnets 106a-d may be arranged in an alternating north and south orientation to maximize the magnetic field gradient and/or energy conversion efficiency. The magnetic field is at a maximum value between two adjacent magnets, e.g., between the magnets 106a-b, where the center of the electrically conductive coils 104a-c may be positioned to maximize the energy conversion efficiency. The relative movement between the one or more magnets 106a-d and the one or more electrically conductive coils 104a-c of the coil plate 102 due to an applied acceleration produces the electromotive force.

The coil plate 102 may have multiple layers. Each layer of the coil plate may have a coil array. The coil array has one or more electrically conductive coils ("coils") 104a-c. The one or more electrically conductive coils 104a-c may be fabricated on a copper clad polyimide laminate. The copper clad polyimide laminate may be formed by laser cutting polyimide that is pre-coated with copper. The induced electromotive force is proportional to the total number of turns of the coils of the coil plate 102. The electromotive force increases as the number of coil turns increases. More coil turns result in a larger electromotive force produced from the relative movement between the one or more coils 104a-c and the one or more magnets 106a-d of the magnetic array 106.

Figure 1B:
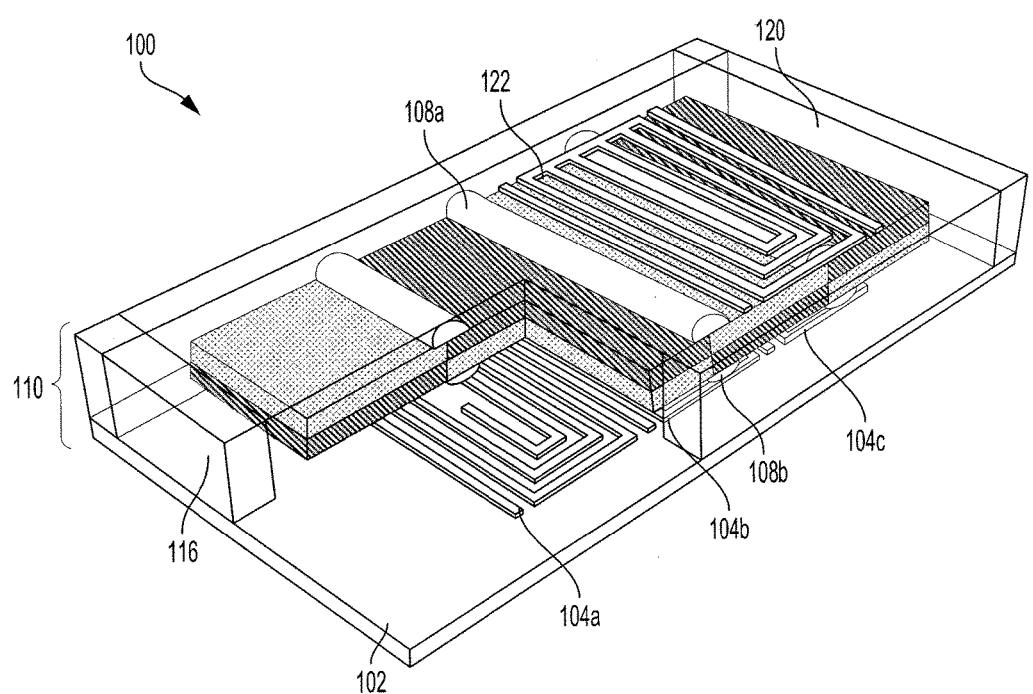
FIG. 1B illustrates a cross-sectional view of an example non-resonant vibration energy harvester having two coil plates according to an aspect of the invention.

The vibration energy harvester 100 includes the chamber 110. The chamber 110 may be formed from an acrylic and laser-cut frame 116 bonded to the coil plate 102. The chamber 110 encloses the magnetic array 106 that is suspended above the coil plate 102. A liquid bearing 108 suspends and/or levitates the magnetic array 106 above the coil plate 102. Another coil plate 120 may be positioned above the magnetic array 106 to increase an amount of electromotive force generated from an applied acceleration to the chamber 110, as shown in FIG. 1B, for example.

The vibration energy harvester 100 includes a liquid bearing 108. The liquid bearing may be self-assembling. That is, the liquid bearing automatically aligns along a boundary between two magnets of the magnetic array 106 because the magnetic attraction is greatest at the boundary between the two magnets. The liquid bearing concentrates along a boundary between two magnets because the magnetic flux is at a maximum between two magnets, and may have a top portion 108a and a bottom portion 108b. The liquid bearing 108 allows a vibration source to produce a relative motion between the magnetic array 106 and the coil plate 102 and reduces friction between the magnetic array 106 and the coil plate 102.

The liquid bearing 108 may be water or other liquid, or a ferrofluid. A ferrofluid is a liquid that becomes strongly magnetized in the presence of a magnetic field, and is attracted by a magnet. The ferrofluid may be water-based, e.g., Ferrotec EMG 705, or based on synthetic hydrocarbon. The ferrofluid liquid bearing levitates the magnetic array 106 over a coil array and follows the movement of the magnetic array 106 during vibration. By suspending the magnetic array 106 over the coil plate 102, the liquid bearing 108 minimizes or reduces the drag or pull of the magnetic array 106 when acceleration is applied to the chamber 110.

The vibration energy harvester 100 may have a hydrophobic surface over the liquid bearing 108. The hydrophobic surface reduces friction of the liquid bearing 108. The water-based ferrofluids are more hydrophobic than the synthetic hydrocarbon ferrofluids. For example, among the water based ferrofluids, EMG 705 with anionic as surfactant has the highest contact angle and the lowest friction.

The vibration energy harvester 100 converts kinetic energy, such as vibration energy, into electrical energy. The amount of electromotive force generated by the vibration energy harvester 100 depends on the configuration of the vibration energy harvester 100, e.g., the position of the magnetic array 106 relative to one or more coil plates 102, 120, the amount of applied acceleration and the amount of drag between the coil plates 102, 120 and the magnetic array 106. The larger the applied acceleration to the vibration energy harvester 100, the greater the displacement of the relative movement between the coil plate 102 and the magnetic array 106 and the greater the electromotive force that is generated.

The amount of drag between the coil plate 102 and the magnetic array 106 is based on the electromagnetic characteristics of the magnetized particles in the liquid bearing 108, the viscosity of the liquid bearing 108 and/or the surface area of the liquid bearing 108 in contact with the coil plate 102. The electromagnetic force of the magnetic particles, the amount of surface area and the viscosity of the liquid bearing 108 are directly correlated with the drag between the magnetic array 106 and the coil plate 102. The amount of drag is directly correlated with the amount of power generated from an applied acceleration to the chamber 110. That is, higher the viscosity, greater the surface area, and/or stronger the magnetic strength of the magnetic particles, the larger the drag and the smaller the amount of displacement and/or relative movement between the magnetic array 106 and the coil plate 102 for an applied acceleration. The vibration energy harvester 100 produces less electrical energy with a smaller amount of displacement.

The vibration energy harvester 100 may have a top coil plate 120 and a bottom coil plate 102. The top coil plate 120 is above the magnetic array 106 and has one or more coils 122 facing a top surface of the magnetic array 106. The bottom coil plate 102 is below the magnetic array 106 and has one or more coils 104a-c facing a bottom surface of the magnetic array 106. The amount of electrical energy generated from the displacement of the magnetic array 106 may be approximately doubled when the magnetic array 106 is sandwiched between two coil plates 102,120. FIG. 1B illustrates a vibration energy harvester 100 having a top coil plate 120 and a bottom coil plate 102.

Figure 2:
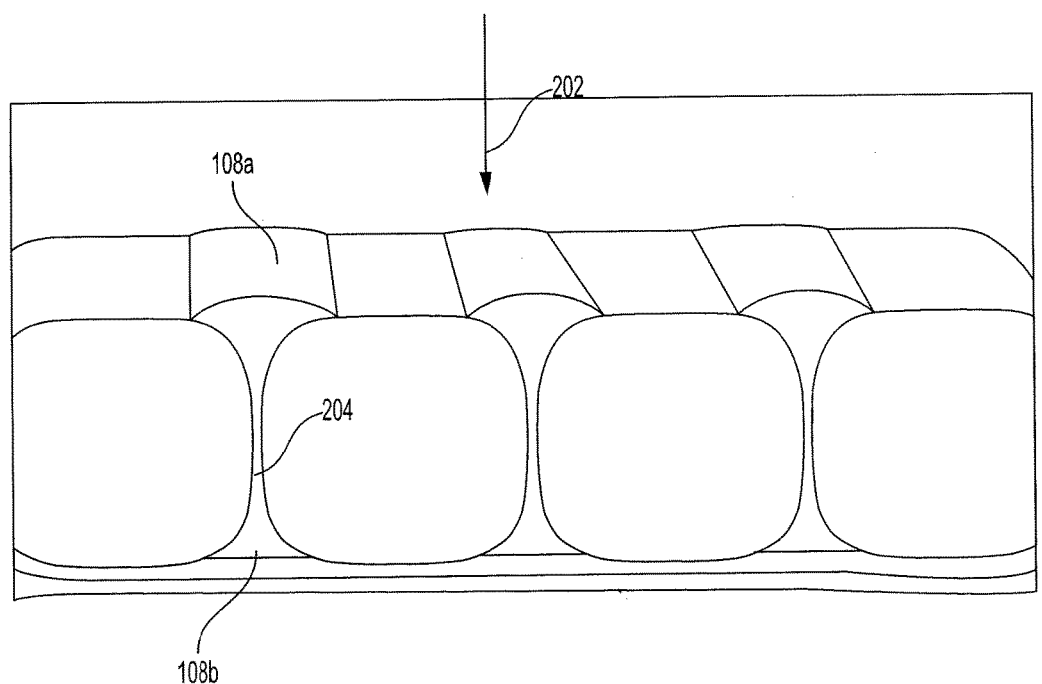
FIG. 2 illustrates a cross-sectional view of the liquid bearing suspending the magnetic array according to an aspect of the invention.

The distance between the magnetic array 106 and the one or more coil plates 102 or 120 effects the amount of electromotive force that the vibration energy harvester 100 generates from the applied acceleration. FIG. 2 shows a close-up view of the magnetic array 106 with the liquid bearing 108. The ferrofluid liquid bearing, such as a ferrofluid liquid bearing, concentrates along the boundary 204 of the first magnet 106a and the second magnet 106b of the magnetic array 106, for example. A downward gravitational force 202 may act on the magnetic array 106. The downward gravitational force 202 may cause the bottom portion 108b of the ferrofluid liquid bearing to be flatter than the top portion 108a. When the downward gravitational force 202 acts on the magnetic array 106, the bottom portion 108b is flatter than the top portion 108a and the distance between the magnetic array 106 and the coil plate 102 is less which increases the efficiency of electrical energy conversion when the chamber 110 is displaced by an applied acceleration.

The distance between the magnetic array 106 and the coil plate 102 below the magnetic array 106 is based on the magnetic properties and/or viscosity of the ferrofluid liquid bearing. The stronger the magnetic properties and/or the greater the viscosity of the ferrofluid liquid bearing, the greater the distance the magnetic array 106 is levitated and/or supported above the coil plate 102.

Figure 3A:
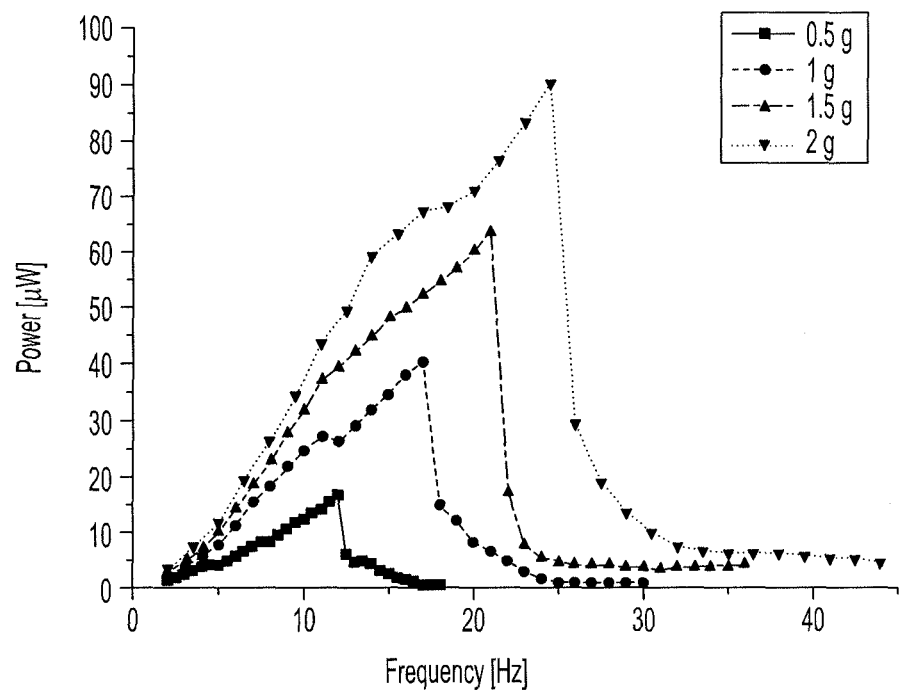
FIG. 3A illustrates the measured frequency response of an example vibration energy harvester under various acceleration according to an aspect of the invention.
Figure 3B:
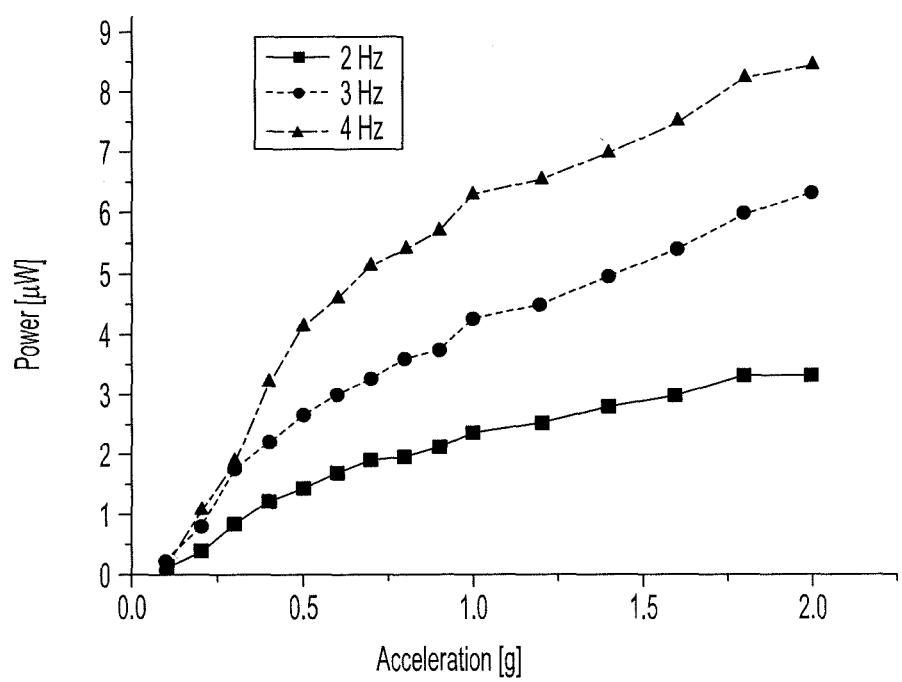
FIG. 3B illustrates the measured power delivered by the vibration energy harvester of FIG. 3A to a matched load of 80Ω at 2-4 Hz according to an aspect of the invention.

The vibration energy harvester 100 may be tuned to more efficiently capture and convert vibration energy into electrical energy. The configuration of the vibration energy harvester 100 including the movable range of the magnetic array 106, the number of layers of coil and/or the number of coils in the coil array may be adjusted to improve energy conversion efficiency. For example, a vibration energy harvester 100 may have a chamber 110 with a length of 15.7 mm and a magnetic array 106 with a movable range of 3 mm. The power output peaks at a higher frequency when the applied acceleration is larger, as can be seen in FIG. 3A. Before the peak, the power output is limited by the movable range of the magnetic array 106 when the magnetic array does not touch the chamber 110. The vibration amplitude is less than the critical amplitude, and consequently, the relative velocity decreases as the frequency is increased for a given acceleration. The relative velocity between the magnetic array 106 and the coil plate 102 is correlated with the frequency of the vibration. FIG. 3A illustrates the measured frequency response of the vibration energy harvester 100 under various acceleration. FIG. 3B illustrates the measured power delivered to a matched load of 80Ω which reaches μW level at 2-4 Hz.

Figure 4A:
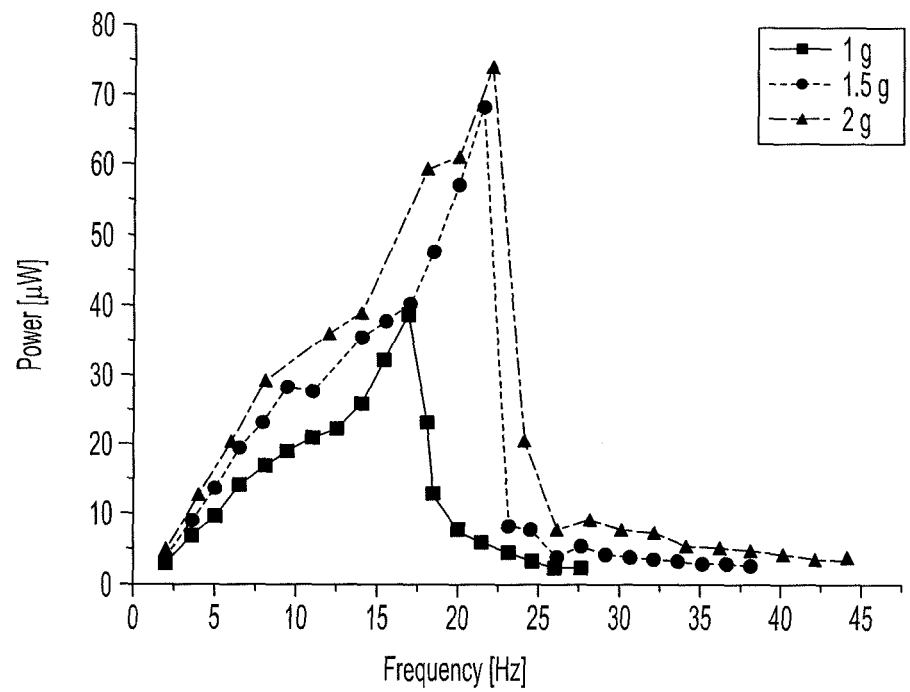
FIG. 4A illustrates the measured frequency response of an example vibration energy harvester having an integrated spring under various acceleration according to an aspect of the invention.
Figure 4B:
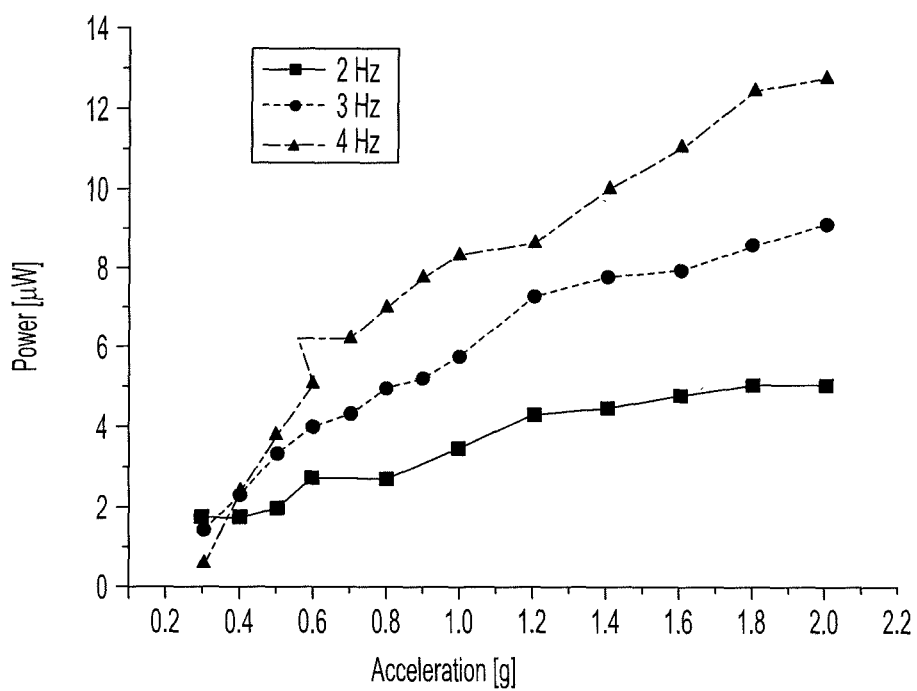
FIG. 4B illustrates the measured power delivered by the vibration energy harvester of FIG. 3B to a matched load of 80Ω at 2-4 Hz according to an aspect of the invention.

In another example, the same vibration energy harvester 100 that has an interior chamber length of 15.7 mm and a magnetic array 106 with a movable range of 3 mm may have an integrated spring to scavenge vibration energy when the magnetic array 106 collides with the chamber 110. The spring may be formed from folded, acrylic on the chamber. FIG. 4A illustrates the measured frequency response of the vibration energy harvester 100 having the integrated spring under various acceleration. FIG. 4B illustrates the measured power delivered to a matched load of 80Ω which reaches a μW level at 2-4 Hz. The power peak appears at a higher frequency when the applied acceleration is larger. The power delivered to a matched load of 80Ω from a 2-4 Hz vibration is higher with a spring. The added spring produces ringing, after the magnetic array 106 collides with the chamber, which increases the root mean square of the output voltage and the power. The ringing is more pronounced when the applied acceleration frequency is lower.

Figure 5A:
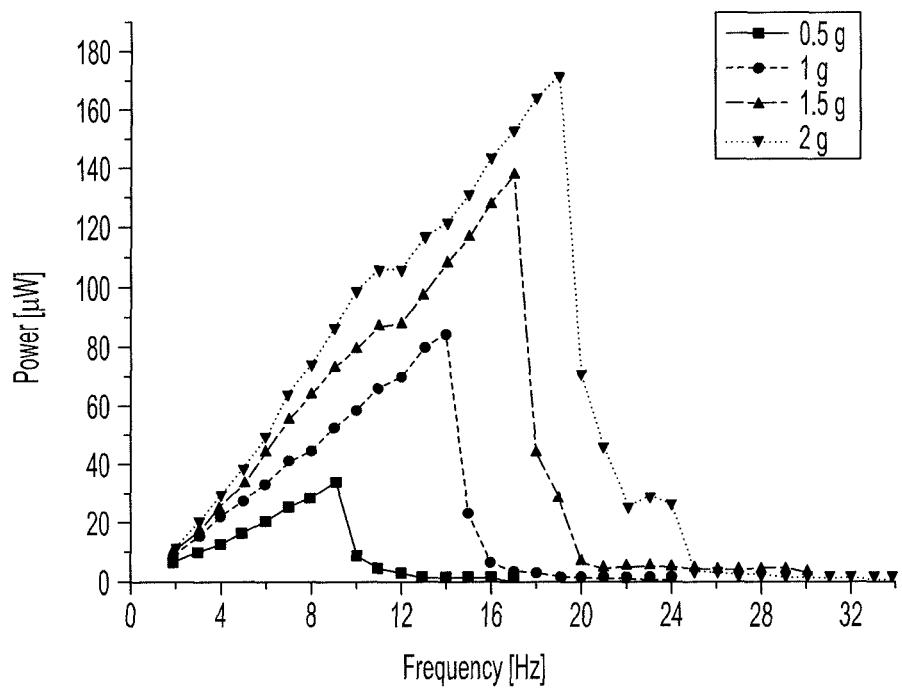
FIG. 5A illustrates the measured frequency response of an example vibration energy harvester having an enlarged movable range of the magnetic array according to an aspect of the invention.
Figure 5B:
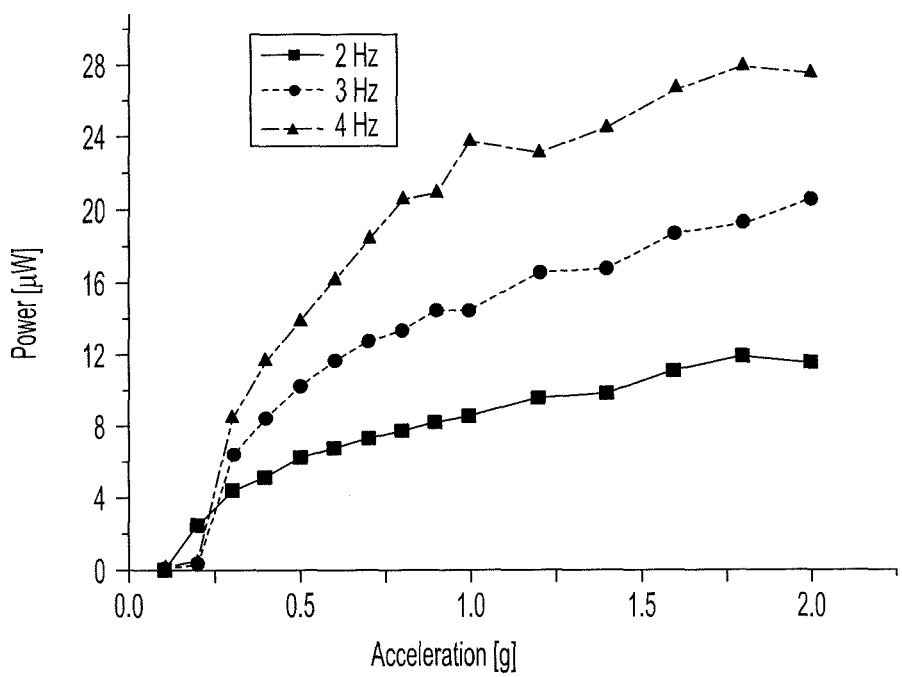
FIG. 5B illustrates the measured power delivered by the vibration energy harvester of FIG. 5A to a matched load of 80Ω at 2-4 Hz according to an aspect of the invention.

The power output may be increased further by enlarging the movable range of the magnetic array 106 because the relative velocity between the magnetic array 106 and the coil plate 102 is proportional to the applied acceleration and the movable range. For example, the length of the interior of the chamber 110 of the vibration energy harvester 100 may be 18.7 mm, and the movable range of the magnetic array may be 6 mm. FIG. 5A illustrates the measured frequency response of the vibration energy harvester 100 having a magnetic array 106 with an enlarged movable range under various acceleration. The increase in the movable range from 3 mm to 6 mm approximately triples the power output, for example. The frequency corresponding to the apex point is lower under the same acceleration. FIG. 5B illustrates the measured power delivered by the vibration energy harvester 100 to a matched load of 80Ω as a function of an applied acceleration at 2-4 Hz.

Figure 6:
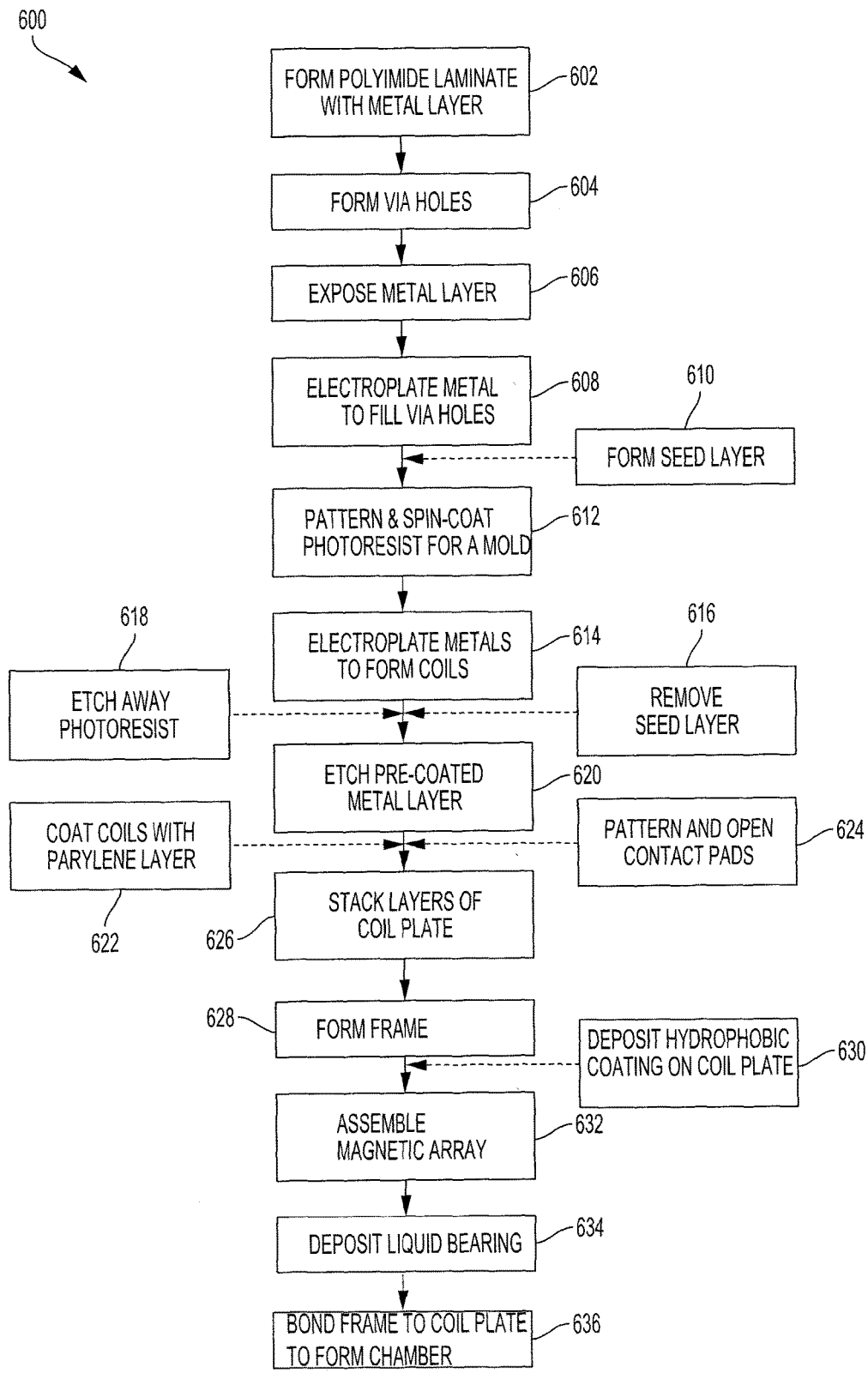
FIG. 6 is a flow diagram of an example process for fabricating a vibration energy harvester according to an aspect of the invention.

FIG. 6 is a flow diagram of a process for fabricating a vibration energy harvester 100. A fabrication system may have one or more processors, appropriately programmed, to implement the process 600 to form the vibration energy harvester 100. The vibration energy harvester 100 has a coil plate 102, a magnetic array 106 and a chamber 110. FIGS. 7A-7F illustrate the fabrication of the coil plate 102.

The fabrication system forms a polyimide laminate 702 with a metal layer 704 to form the coil plate 102 (602). The polyimide laminate may be pre-coated with the metal layer 704, such as copper, and/or have an adhesive. The copper, adhesive and polyimide may have a thickness of approximately 35 μm, 13 μm and 25 μm, respectively.

Figure 7A:
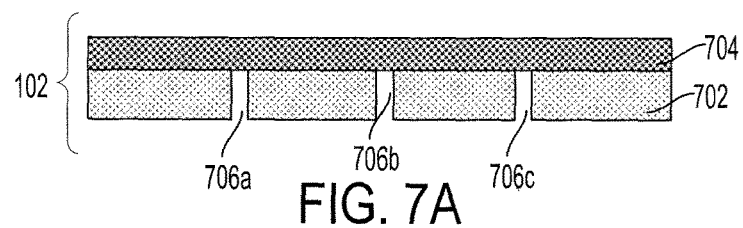
FIGS. 7A-7F illustrate cross-sectional views of an example coil plate of the vibration energy harvester being formed by the process of FIG. 3 according to an aspect of the invention.
Figure 7B:
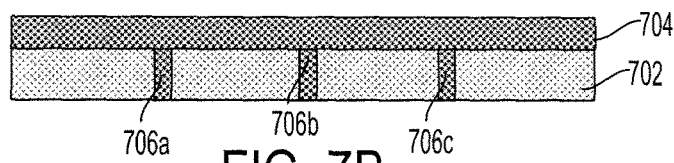

The fabrication system forms one or more vertical interconnect access (VIA) holes 706a-d into the polyimide laminate 702 (604). The VIA holes 706a-d may be formed by laser-cutting. The one or more VIA holes 706a-d provide access to the metal layer 704 through the polyimide laminate 702. Back-to-front alignments marks may also be formed by laser-cutting of the polyimide laminate 702. FIG. 7A illustrates the polyimide laminate 702 with the pre-coated metal layer 704.

The fabrication system may remove the adhesive and expose the metal layer 704 by performing Oxygen Reactive Ion Etching ($O_2$ RIE) (606). The fabrication system may perform the etching for approximately 10 minutes to remove the adhesive and expose the metal layer 704. After the adhesive is removed and the metal layer 704 is exposed, the fabrication system electroplates or fills the one or more VIA holes 706a-d that may be approximately 35 μm deep with metal, such as copper (608).

The fabrication system may perform evaporation (or sputter) deposition to deposit a first set of one or more metal portions on top of the polyimide laminate 702 as a seed layer (610). The one or more metal portions may be formed from Titanium (Ti) or Copper (Cu). The evaporation deposition may be performed using an electron-beam evaporator.

Figure 7C:
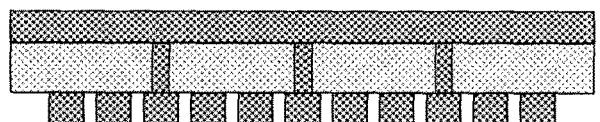

After evaporation (or sputter) deposition of the first set of the one or more metal portions, the fabrication system may spin-coat and pattern a photoresist for a mold for the one or more coils 708a-b (612). The photoresist may have a thickness of approximately 30 μm. The fabrication system electroplates a metal, such as Cu, to form one or more coils 708a of the coil plate 102 on a backside of the polyimide laminate 702 using the mold (614). The Cu metal may have a thickness of approximately 30 μm. After electroplating, the fabrication system may remove the seed layer (616) and the photoresist (618) to form the coil plate 102. The seed layer may be removed in acetone, and the photoresist 710 may be etched away to form the one or more coils 708a of the coil plate 102. FIG. 7C illustrates the formation of the one or more coils 708a on the backside of the polyimide laminate 702.

Figure 7D:
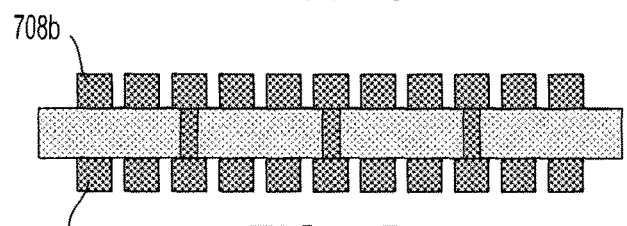

The fabrication system etches the pre-coated metal layer 704 that is on top of the polyimide laminate 702 to form one or more coils 708b, e.g., one or more electrically conductive coils, on the front side (620). The fabrication system may use an isotropic etchant to etch the metal layer 704. FIG. 7D illustrates the formation of the one or more coils 708b on the front side.

Figure 7E:
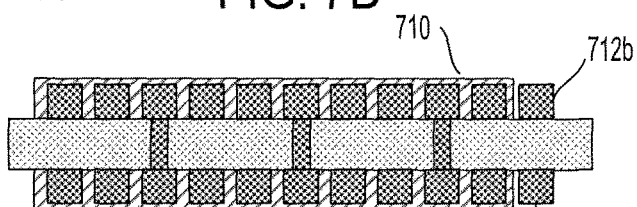

The fabrication system coats the one or more coils 708a-b on both sides with a parylene layer for isolation (622). The fabrication system may photolithographically pattern and open one or more contact pads 712a-d to allow for an electrical connection between different layers (624). FIG. 7E illustrates the formed one or more contact pads 712a-d and the one or more coils 708a-b coated with the parylene layer.

Figure 7F:
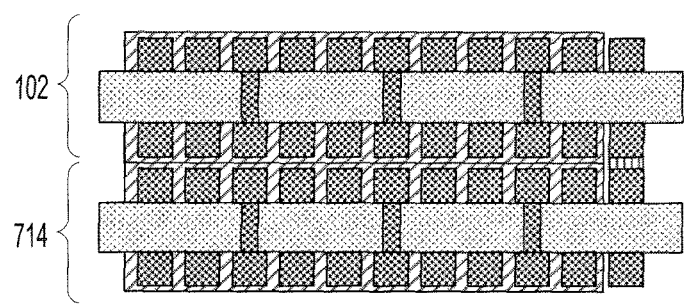

The fabrication system may stack and connect multiple double-sided coil plates 102,714 using a low temperature solder paste (626). The one or more additional coil plates 714 increase the induced electromotive force because of the increase in the number of coil turns, but the additional coil plates contributes less and less electromotive force, since the distance between the additional coil plates and the magnetic array 106 increases, while the total resistance of the coil plates increases proportionally to the number of coil plates. FIG. 7F illustrates the one or more coils in a stacked configuration.

The fabrication system may form a frame 116 using a laser-cut acrylic (628), and deposit a super-hydrophobic coating on the surface of the coil plate 102 and on the inside of the frame 116 (630). The fabrication system may assemble one or more magnets 106a-d to form a magnetic array 106 within a recessed region of a laser-cut acrylic plate or frame 116 (632). The one or more magnets 106a-d may be arranged with alternating north and south poles and may be NgFeB magnets. After the one or more magnets 106a-d are assembled, the fabrication system may deposit the liquid bearing 108 on portions of the magnetic array 106 in between the one or more magnets 106a-d (634). The fabrication system bonds the frame 116 to the coil plate 102 to form the chamber 110 (636).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-resonant vibration energy harvester that converts kinetic energy to electrical energy, comprising:
    an electrically conductive coil array;
    a magnetic array having a first magnet, a second magnet that is directly abutting the first magnet and a boundary in between the first magnet and the second magnet, the magnetic array and the electrically conductive coil array being configured to generate the electrical energy from a relative movement between the magnetic array and the electrically conductive coil array; and
    a liquid bearing that concentrates over and around the boundary and having a top portion above the first magnet and the second magnet and a bottom portion below the first magnet and the second magnet, the bottom portion being flatter than the top portion and that separates the magnetic array from the electrically conductive coil array and levitates the magnetic array over the electrically conductive coil array.

2. The non-resonant vibration energy harvester of claim 1, wherein the bottom portion is flatter than the top portion due to a gravitational force exerted on the magnetic array.

3. The non-resonant vibration energy harvester of claim 1, wherein the magnetic array has a plurality of magnets including 2-10 Neodymium (NdFeB) magnets with a polarization in a vertical direction.

4. The non-resonant vibration energy harvester of claim 1, further comprising:
    a coil plate that has the electrically conductive coil array embedded within; and
    a chamber housing the magnetic array and placed on top of the coil plate to enclose the magnetic array, the liquid bearing and the electrically conductive coil array.

5. The non-resonant vibration energy harvester of claim 1, wherein the electrical energy generated from the relative movement between the magnetic array and the electrically conductive coil array is based on at least one of a viscosity, a surface area or magnetic characteristics of the liquid bearing.

6. The non-resonant vibration energy harvester of claim 1, wherein the liquid bearing is a self-assembled liquid bearing and is formed from a ferrofluid that becomes magnetized in a presence of a magnetic field and is attracted by a magnet.

7. The non-resonant vibration energy harvester of claim 6, wherein a surface of the electrically conductive coil array that is adjacent to the liquid bearing has a hydrophobic coating to reduce friction.

8. The non-resonant vibration energy harvester of claim 6, wherein the electrically conductive coil array has one or more coils.

9. The non-resonant vibration energy harvester of claim 8, wherein the ferrofluid follows the first magnet and the second magnet during vibration which produces the relative movement between the magnetic array and the electrically conductive coil array.

10. A non-resonant vibration energy harvester that converts kinetic energy to electrical energy, comprising:
    a coil plate having one or more electrically conductive coils;
    a magnetic array having a plurality of magnets including a first magnet, a second magnet that is directly abutting the first magnet and a boundary in between the first magnet and the second magnet;
    a ferrofluid liquid that concentrates over and around the boundary in between the first magnet and the second magnet, the ferrofluid liquid having a top portion above the first magnet and the second magnet and a bottom portion below the first magnet and the second magnet, the bottom portion being flatter than the top portion and that separates the first magnet and the second magnet from the one or more electrically conductive coils and reduces movement of the first magnet and the second magnet when an applied acceleration causes the one or more electrically conductive coils to move relative to the plurality of magnets; and
    a chamber that encloses the coil plate, the magnetic array and the ferrofluid liquid within the chamber.

11. The non-resonant vibration energy harvester of claim 10, wherein the plurality of magnets are arranged in an alternating north and south orientation.

12. The non-resonant vibration energy harvester of claim 10, wherein each conductive coil of the one or more electrically conductive coils has a number of turns and an amount of the electrical energy produced by the relative movement between the plurality of magnets and the one or more electrically conductive coils is correlated with the number of turns.

13. The non-resonant vibration energy harvester of claim 10, wherein the relative movement between the plurality of magnets and the one or more electrically conductive coils is proportional to an applied vibration amplitude and dependent on a vibration frequency.

14. The non-resonant vibration energy harvester of claim 10, wherein the ferrofluid liquid levitates the first magnet and the second magnet over the one or more electrically conductive coils.

* * * * *